(12) United States Patent  
Hirose

(10) Patent No.: US 7,215,485 B2  
(45) Date of Patent: May 8, 2007

(54) ZOOM LENS FOR IMAGE CAPTURING ELEMENT

(75) Inventor: Takuma Hirose, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/359,250

(22) Filed: Feb. 22, 2006

(65) Prior Publication Data  
US 2006/0146419 A1    Jul. 6, 2006

(30) Foreign Application Priority Data  
Mar. 1, 2005    (JP) .............................. 2005-055982

(51) Int. Cl.  
  *G02B 15/14* (2006.01)
(52) U.S. Cl. ...................... 359/687; 359/684
(58) Field of Classification Search ................ 359/683, 359/684, 687  
See application file for complete search history.

(56) References Cited

U.S. PATENT DOCUMENTS 5,886,828 A * 3/1999 Kim ........................... 359/687

* cited by examiner

*Primary Examiner*—Ricky Mack  
*Assistant Examiner*—William Choi  
(74) *Attorney, Agent, or Firm*—Cohen Pontani Lieberman & Pavane LLP

(57) ABSTRACT

A rear focus type zoom lens for an image capturing element, comprising, in the order from the object side: a first lens group having a positive refracting power; a second lens group having a negative refracting power and movable for variable magnification; a third lens group having a positive refracting power; and a fourth lens group having a positive refracting power and movable for correcting positional change of an image plane in variable magnification. When $\nu 1$ represents Abbe's number of at least one piece of positive lenses of the first lens group, $\nu 31$ represents Abbe's number of a single lens, fi represents a focal length of an $i^{th}$ lens group and f4– represents a focal length of the negative lens in the fourth lens group, the following conditional expressions are satisfied:

$75.0 < \nu 1$, $40.0 > \nu 31$, $0.8 < f4/f4- | < 1.5$, $3.0 < |f1/f2| < 6.0$.

18 Claims, 10 Drawing Sheets

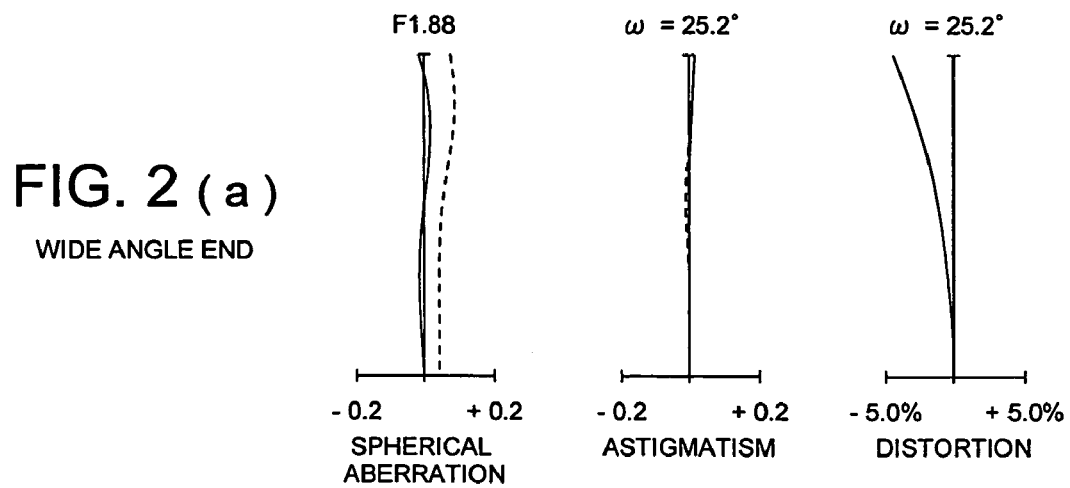
FIG. 2(a) WIDE ANGLE END
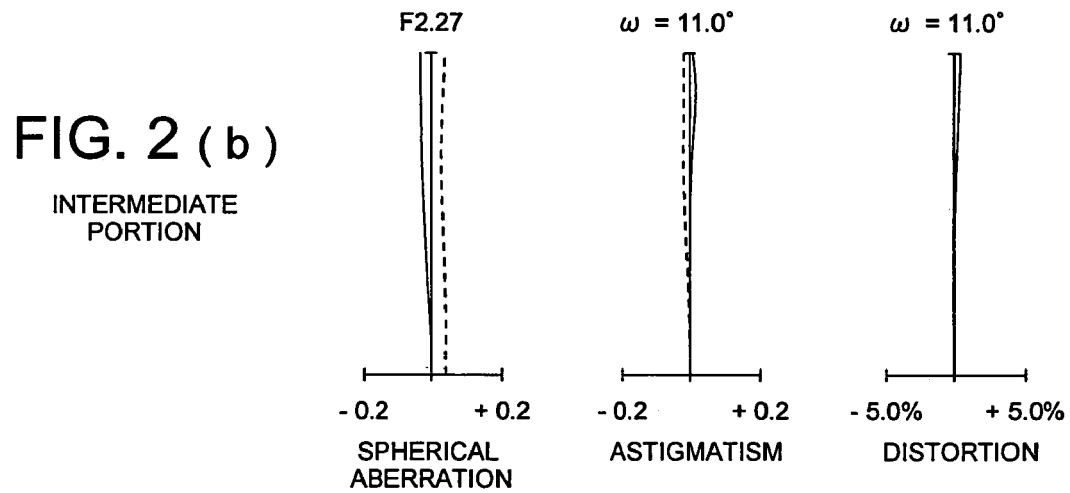
FIG. 2(b) INTERMEDIATE PORTION
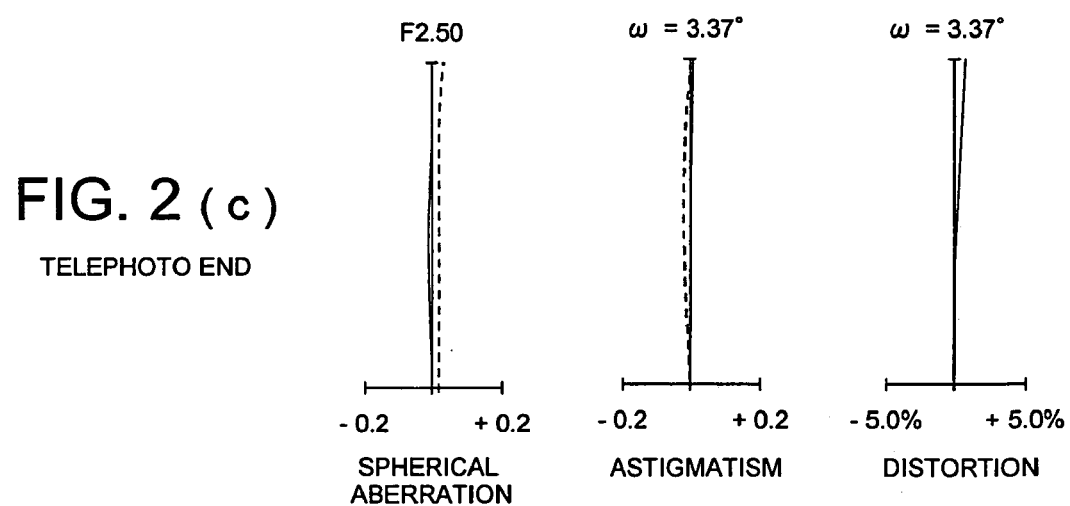
FIG. 2(c) TELEPHOTO END

WIDE ANGLE END

INTERMEDIATE PORTION

TELEPHOTO END

WIDE ANGLE END

INTERMEDIATE PORTION

TELEPHOTO END

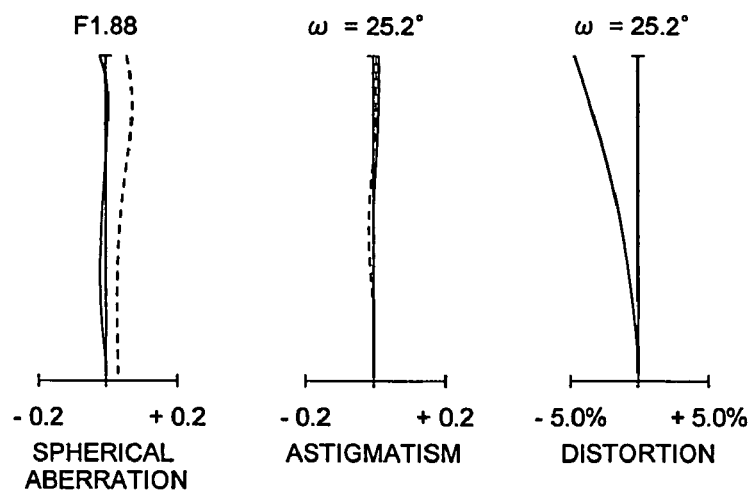
FIG. 8 (a) WIDE ANGLE END
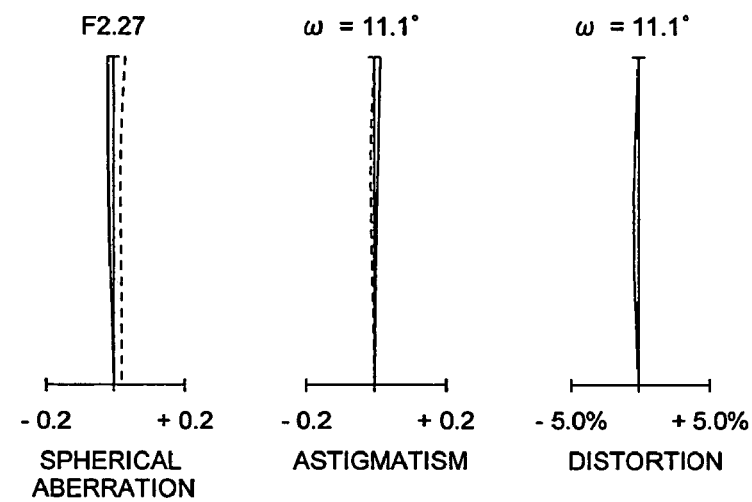
FIG. 8 (b) INTERMEDIATE PORTION
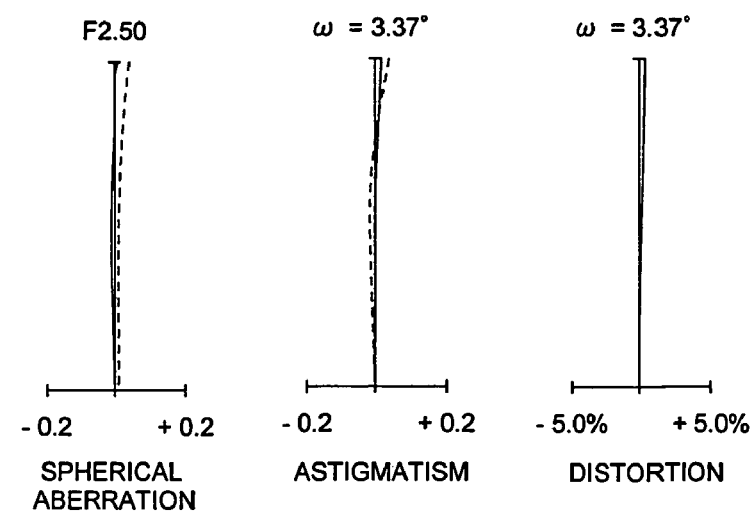
FIG. 8 (c) TELEPHOTO END

WIDE ANGLE END

INTERMEDIATE PORTION

TELEPHOTO END

ZOOM LENS FOR IMAGE CAPTURING ELEMENT

This application is based on Japanese Patent Application No. 2005-055982 filed on Mar. 1, 2005, in Japanese Patent Office, the entire content of which is hereby incorporated by reference.

BACKGROUND OF THE INVENTION

The present invention relates to a zoom lens for image capturing elements which has a long back focus that allows a color separation prism to be inserted, and is compact despite a high variable magnification, to be used favorably in a video camera.

In recent years, with digitization of a video recorder or the like, a video camera is also required to have high image quality. As an effective means for high image quality, there is given a multiple-plate type wherein a ray of light after photographing is separated by a color separation prism into respective colors of R (red), G (green) and B (blue), and three CCDs (Charge Coupled Device) each corresponding independently to each color are used for image-capturing, whereby images are superposed to obtain high image quality. In the video camera of this kind of a multiple-plate type, there is a strong demand for the zoom lens which has a long back focus that allows a color separation prism to be inserted, and has a high variable magnification.

Namely, in the video camera of a multiple-plate type of this kind, a relatively long back focus is needed and a long exit pupil distance which does not cause color shading is necessary, for arranging a color separation prism, compared with a single-plate type representing a combination of a single CCD and a color filter.

Incidentally, Patent Document 1, for example, discloses a zoom lens which has a long back focus and has a ratio of variable magnification of about 10.

(Patent Document 1) TOKUKAIHEI No. 07-270684

(Disclosure of The Invention)

(Problems to be Solved by the Invention)

However, the zoom lens disclosed by Patent Document 1 has a problem that the number of constituent lenses is as relatively large as 13–14, causing cost increase and weight increase, although its long back focus allowing a color separation prism to be inserted is realized.

SUMMARY OF THE INVENTION

In view of the problems stated above, an object of the present invention is to provide a zoom lens which has a sufficiently long back focus allowing, for example, a color separation prism to be arranged, and yet is compact and is capable of forming an image with high image quality.

BRIEF DESCRIPTION OF THE DRAWINGS

FIGS. 2(a) to 2(c) show aberration diagrams including spherical aberration, astigmatism and distortion of a zoom lens relating to Example 1.

FIGS. 8(a) to 8(c) show aberration diagrams including spherical aberration, astigmatism and distortion of a zoom lens relating to Example 4.

DETAILED DESCRIPTION OF THE PREFERRED EMBODIMENT

Figure 1:
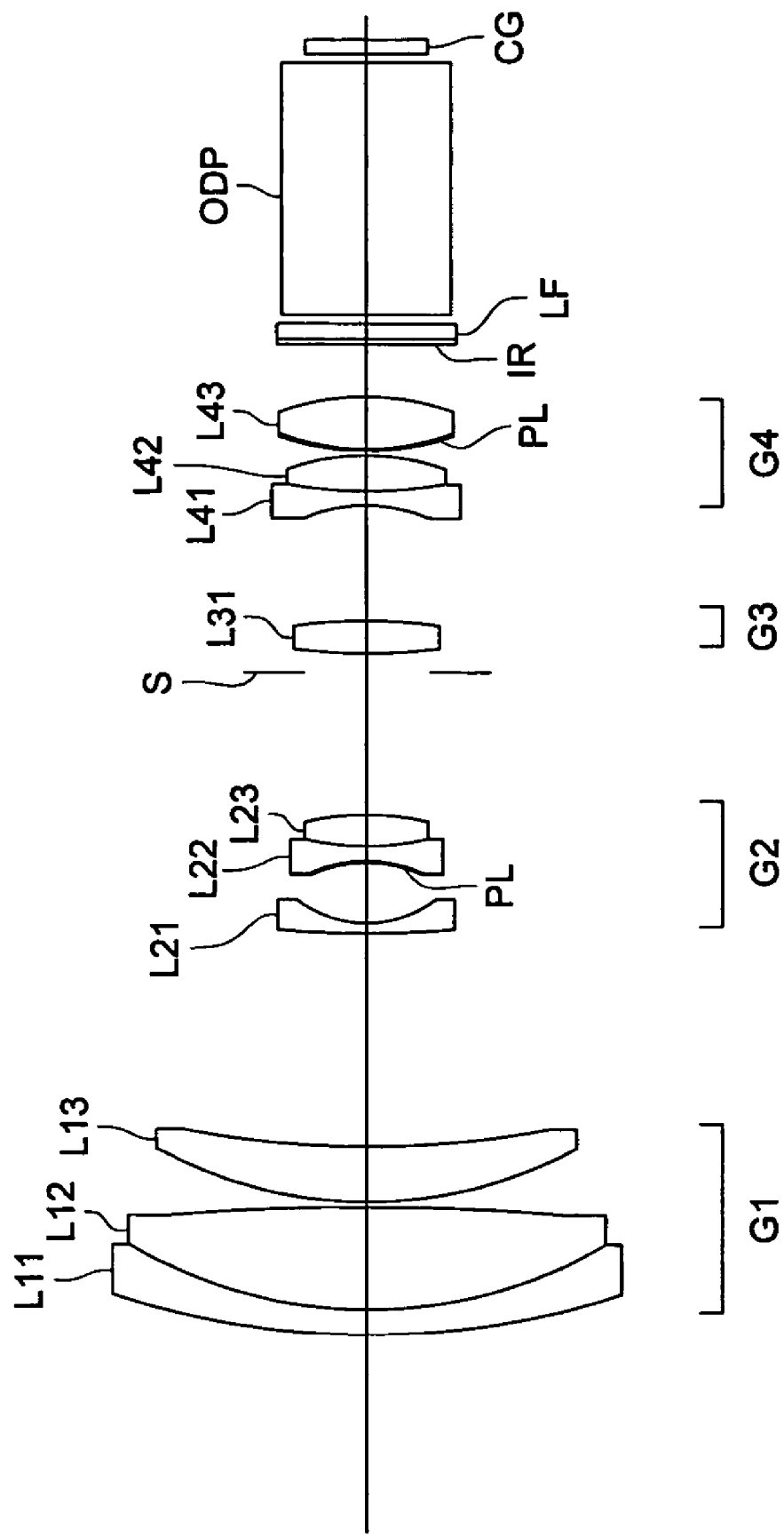
FIG. 1 is a cross-sectional view of an intermediate portion of a zoom lens relating to Example 1.

Firstly, preferable structures to attain the above object are explained.

A zoom lens described in Structure 1 is a rear focus type zoom lens having four lens groups in the order from the object side, including a first lens group having positive refracting power, a second lens group having negative refracting power and moves for variable magnification, a third lens group having positive refracting power and a fourth lens group having positive refracting power and moves for correcting positional change of an image plane in variable magnification, wherein the first lens group is composed, in the order from the object side, of negative lens (L11), positive lens (L12) and positive lens (L13), the second lens group is composed, in the order from the object side, of negative lens (L21), negative lens (L22) and positive lens (L23), the third lens group is composed a single lens (L31) having positive refracting power and having at least one aspheric surface and the fourth lens group having at least one aspheric surface or more and having, in the order from the object side, negative lens (L41), positive lens (L42) and positive lens (L43), and when ν1 represents Abbe's number of at least one piece of positive lens of the first lens group, ν31 represents Abbe's number of the aforesaid single lens (L31), fi represents a focal length of $i^{th}$ lens group and f4− represents a focal length of negative lens (L41) in the fourth lens group, the following conditional expressions are satisfied.

$$75.0 < \nu 1 \tag{1}$$

$$40.0 > \nu 31 \tag{2}$$

$$0.8 < |f4/f4-| < 1.5 \tag{3}$$

$$3.0 < |f1/f2| < 6.0 \tag{4}$$

In the zoom lens of the invention, there are arranged the first lens group having positive refracting power, the second lens group having negative refracting power, the third lens group having positive refracting power, and the fourth lens group having positive refracting power, and when magnification is changed from a wide angle side to telephoto side, the second lens group is moved to the image plane side, and an image plane fluctuation caused by variable magnification is corrected by moving a part or the whole of the fourth lens group toward the object side while keeping a convex locus.

The first lens group is composed, in the order from the object side, of negative lens (L11), positive lens (L12) and positive lens (L13). Due to this structure, a position of the principal point of the first lens group is made to be on the second lens group side, and a distance between the principal point of the first lens group and that of the second lens group at a wide angle end is shortened to realize downsizing of the first lens group.

The second lens group is composed, in the order from the object side, of negative lens (L21), negative lens (L22) and positive lens (L23). Due to this structure, it is possible to control fluctuations of distortion and coma at a wide angle end.

The third lens group is composed of a single lens (L31) having positive refracting power, and each of both sides of this positive lens an aspheric surface form. Due to the structure of this kind of the third lens group, the third lens group can be of the structure of one piece of a single lens, and it is possible to correct various aberrations of a large aperture of f-number of about 1.8. In particular, an aspheric surface form of the third lens group has great effects for correction of spherical aberration.

The fourth lens group is composed, in the order from the object side, of negative lens (L41), positive lens (L42) and positive lens (L43), and the fourth lens group has a lens having at least one surface having an aspheric surface form. Due to the structure of this kind, it is possible to correct aberration by the number of lenses that is as less as three, and to realize a long back focus.

Now, the conditional expressions (1)–(4) will be explained as follows. The conditional expression (1) is an expression to prescribe Abbe's number of a positive lens constituting the first lens group, and when a negative lens and a positive lens employing glass satisfying the conditional expression (1) are included in the structure of the first lens group having positive refracting power on the whole, it is possible to remove secondary spectrum, and to reduce axial chromatic aberration caused in the vicinity of a telephoto end. If Abbe's number becomes smaller exceeding the lower limit of the conditional expression, correction of chromatic aberration near the telephoto end is insufficient.

The conditional expression (2) is an expression to prescribe Abbe's number of a positive lens (L31) constituting the third lens group, and chromatic aberration caused on the fourth lens group is corrected by using high dispersion material that satisfies the conditional expression (2). If Abbe's number grows greater exceeding the upper limit of the conditional expression, correction of chromatic aberration caused on the fourth lens group becomes difficult.

The conditional expression (3) is an expression to prescribe refracting power of a negative lens (L41) in the fourth lens group, and when the lower limit is exceeded, it is difficult to realize a long back focus that allows a color separation optical system to be inserted. If the upper limit is exceeded, correction of spherical aberration is difficult. Further, more preferable is to satisfy conditional expression (7) which will be described later.

The conditional expression (4) is one to prescribe a ratio of refracting power of the first lens group to that of the second lens group, and it is one to determine conditions to obtain excellent image forming function with a long back focus, while achieving downsizing of the total optical system despite high variable magnification. If refracting power of the second lens group becomes weak for refracting power of the first lens group, exceeding the upper limit of the conditional expression (4), an amount of movement of the second lens group caused by variable magnification is increased, and it is difficult to shorten the total lens length and to make a diameter of a front lens. On the contrary, if refracting power of the second lens group becomes strong for refracting power of the first lens group, exceeding the lower limit, it is difficult to correct properly various aberrations including spherical aberration. More preferable is to satisfy conditional expression (8) described later.

Concerning chromatic aberration in general, it is ideal that the aberration is corrected for each lens group. However, it is extremely disadvantageous to correct chromatic aberration completely for each lens group, on the aspects of a size of the total optical system and cost. Therefore, in this lens type, paraxial chromatic aberration caused on the first lens group in the telephoto end is magnified on the second lens group representing the variable magnification section. Further, if the zoom ratio is made to be great, paraxial chromatic aberration at the telephoto end is generated, and for correcting the aberration, correction needs to be conducted on the first and second lens groups on the whole, resulting in a residual magnification chromatic aberration at an intermediate position between the wide angle end and the telephoto end.

In this case, it is considered to extend a distance between the third lens group and the fourth lens group generally, to create an arrangement wherein a light flux passes through the space that is away from the optical axis of the lens group.

However, if such arrangement is employed, the fourth lens group requires a larger effective diameter to become a large-sized zoom lens. Extending a distance between the third lens group and the fourth lens group sufficiently is also a factor for increasing a size.

In the zoom lens of the invention, therefore, magnification chromatic aberration in the direction wherein an image height for g line is smaller than that for d line generated in the first lens group and the second lend group is corrected by generating magnification chromatic aberration in the direction wherein an image height for g line is greater than that for d line in the fourth lens group, without extending a distance between the third lens group and the fourth lens group. As a result, axial chromatic aberration of the fourth lens group is corrected, by generating axial chromatic aberration in the direction opposite to the fourth lens group by using high dispersion glass satisfying the conditional expression (2) in the third lens group, although the axial chromatic aberration remains in the direction wherein g line exceeds d line in the fourth lens group.

Further, in the present invention, paraxial chromatic aberration generated on the first lens group at the telephoto end is reduced to a certain extent, by constituting the first lens group with a lens employing specific low dispersion glass or abnormal dispersion glass satisfying the conditional expression (1). As a result, a distance between the third lens group and the fourth lens group is further shortened to contribute to downsizing of a lens unit. Incidentally, the glass of this kind is effective to be used for both of positive lens (L12) and positive lens (L13) constituting the first lens group. However, when it is used for the positive lens (L12), a diameter of a front lens can be made small. On the other hand, the positive lens (L12) is cemented to negative lens (L11) in many cases, and when considering a failure in the case of cementing, it is possible to restrain cost increase, if the specific low dispersion lens whose cost is relatively high is used as a single positive lens (L13) individually.

A zoom lens described in Structure 2 is the zoom lens according to the Structure 1 wherein the positive lens (L12) included in the first lens group satisfies the following conditional expression.

$$75.0 < v1$$

(5)

A zoom lens described in Structure 3 is the zoom lens according to Structure or Structure 2 wherein the second lend group has a lens having an aspheric surface form on at least one surface thereof.

In the second lens group, it is possible to correct various aberrations by providing an aspheric surface on at least one surface. The aspheric surface of the second lens group corrects off-axis aberration caused mainly by refraction of off-axis principal ray, especially corrects distortion.

A zoom lens described in Structure 4 is the zoom lens according to any one of Structure 1 –Structure 3 wherein one or more of negative lenses included in the second lens group is a compound aspheric lens wherein an aspheric resin is formed on a glass spherical surface.

In one or more of negative lenses included in the second lens group, if a glass spherical surface lens and an aspheric surface resin are compounded, options for types of glass are broadened and effects of correction for various aberrations grow greater, compared with a glass mold lens and a plastic lens. In addition, by cementing lenses, each of them becomes relatively easier than a single lens.

A zoom lens described in Structure 5 is the zoom lens according to any one of Structure 1 –Structure 4 wherein the second lens group has a cemented lens wherein negative lens (L22) and positive lens (L23) are cemented.

A zoom lens described in Structure 6 is the zoom lens according to any one of Structure 1 –Structure 5 wherein the first lens group has a cemented lens wherein negative lens (L11) and positive lens (L12) are cemented.

A zoom lens described in Structure 7 is the zoom lens according to any one of Structure 1 –Structure 6 wherein when a focus length of the zoom lens at a wide angle end is fw, the third lens group satisfies the following conditional expression.

$$6.0 < f3/fw < 13.0 \quad (6)$$

The conditional expression (6) is one to prescribe refracting power of the third lens group, and when the lower limit of the conditional expression (6) is exceeded, refracting power of the third lens group becomes too strong, whereby, it is difficult to secure a sufficient back focus, and correction of spherical aberration is insufficient even when an aspheric surface is used.

A zoom lens described in Structure 8 is the zoom lens according to any one of Structure 1 –Structure 7 wherein the third lens group is composed of a single lens with positive refracting power having an aspheric surface form on both sides of the single lens.

A zoom lens described in Structure 9 is the zoom lens according to any one of Structure 1 –Structure 8 wherein the third lens group is composed of a plastic lens with positive refracting power having an aspheric surface form on both sides of the plastic lens.

When the third lens group is constituted with a single lens that is made of plastic material, cost and weight are more reduced than the occasion to use glass material to make the single lens, which is an advantage.

A zoom lens described in Structure 10 is the zoom lens according to any one of Structure 1 –Structure 9 wherein the fourth lens group has a cemented lens wherein negative lens (L41) and positive lens (L42) are cemented.

A zoom lens described in Structure 11 is the zoom lens according to any one of Structure 1 –Structure 10 wherein the positive lens (L43) included in the fourth lens group is a compound aspheric surface lens wherein aspheric surface resin is formed on a glass spherical surface.

Even in the case of a lens having an aspheric surface form used in the fourth lens group, if a glass spherical surface lens and an aspheric surface resin are compounded, in the same way as in the second lens group, options for types of glass are broadened and effects of correction for various aberrations grow greater, compared with a glass mold lens and a plastic lens. In addition, by cementing lenses, each of them becomes relatively easier than a single lens.

A zoom lens described in Structure 12 is the zoom lens according to any one of Structure 1 –Structure 11 wherein when a focus length of the zoom lens at a wide angle end is fw and an air conversion distance from a lens final face to a image plane at a wide angle end is Bfw, the following conditional expression is satisfied.

$$2.5 < Bfw/fw < 5.0 \quad (7)$$

The conditional expression (7) is to defines the back focus. Therefore, if the value of (Bfw/fw) is lower than the lower limit of the conditional expression (7), the back focus becomes too short so that a space to accommodate a color separation prism becomes insufficient. On the other hand, if the value of (Bfw/fw) exceeds the upper limit of the conditional expression (7), the total length of the lens whole body is expanded so that the zoom lens loses the compactness.

A zoom lens described in Structure 13 is the zoom lens according to any one of Structure 1 –Structure 12 wherein the following conditional expression is satisfied.

$$0.9 < f4/|f4-| < 1.3 \quad (8)$$

A zoom lens described in Structure 14 is the zoom lens according to any one of Structure 1 –Structure 13 wherein the following conditional expression is satisfied.

$$4.5 < |f1/f2| < 6.0 \quad (9)$$

A zoom lens described in Structure 15 is the zoom lens according to any one of Structure 1 –Structure 14 wherein the following conditional expression is satisfied.

$$8.5 < f3/fw < 13 \quad (10)$$

A zoom lens described in Structure 16 is the zoom lens according to any one of Structure 1 –Structure 15 wherein a diaphragm is arranged on the object side of the third lens group, and an aperture diameter is changed by its position on the optical axis of the second lens group.

In the invention, it is possible to control an aperture diameter based on the position on the optical axis of the second lens group, for the reasons to reduce illuminance unevenness on an image plane while cutting a harmful light flux causing flare components, to simplify correction of aberration at a telephoto end, and to give room to the design.

A zoom lens described in Structure 17 is the zoom lens according to any one of Structure 1 –Structure 16 wherein focusing is carried out for an object at an infinite position up to an object at a short distance, by moving the fourth lens group in the optical axis direction.

When photographing an object at an infinite position up to an object at a short distance by using a zoom lens of the invention, if focusing is conducted by moving the fourth lens group toward the object side, an effective diameter of the first lens group may be made smaller and downsizing of the total lens system becomes easy, compared with a zoom lens wherein focusing is carried out by moving the first lens group, which is an advantage.

A zoom lens described in Structure 18 is the zoom lens according to any one of Structure 1 –Structure 17 wherein a color separation optical element is arranged on the image surface side of the fourth lens group.

(Effect of the Invention)

The present invention makes it possible to provide a zoom lens which is compact and is capable of forming an image with high image quality, while having a sufficiently long back focus that allows, for example, a color separation prism to be arranged.

Referring to the drawings, there will be explained as follows, examples of the zoom lens of the invention to which, however, the invention is not limited. Symbols used for respective examples are as follows.

f: Focal length
F: F-number
ω: Half field angle
r. Radius of curvature of each surface of the lens
d: Lens thickness or lens distance
nd: Refractive index
vd: Abbe's number A form of an aspheric surface in each example is expressed by "Numeral 1" wherein the origin is a peak of the surface, X-axis is in the optical axis direction, and h represents a height in the direction perpendicular to the optical axis;

$$X = \frac{h^2/R}{1+\sqrt{1-(1+K)h^2/R^2}} + \sum A_i h^i \quad \text{(Numeral 1)}$$

where, $A_i$ represents $i^{th}$ order aspheric surface coefficient, R represents a radius of curvature and K represents a conic constant.

Incidentally, hereunder (including lens data of the table), the power exponent of 10 (for example, 2.5×10–02) is expressed by using E (for example, 2.5E–02).

EXAMPLE 1

Lens data of a zoom lens relating to Example 1 are shown in Table 1. Further, FIG. 1 shows a cross-sectional view of the intermediate portion of the zoom lens relating to Example 1, and FIG. 2 shows aberration diagrams including spherical aberration, astigmatism and distortion of the zoom lens relating to Example 1. In this case, FIG. 2(a) is an aberration diagram at a wide angle end. FIG. 2(b) is an aberration diagram in the intermediate portion. FIG. 2(c) is an aberration diagram at a telephoto end. Incidentally, in the aberration diagram from now on, solid lines represent d line and dotted lines represent g line on the spherical aberration diagram, and solid lines represent d line and dotted lines represent g line on the spherical aberration diagram, and solid lines represent sagittal image plane and dotted lines represent meridional image plane in the astigmatism diagram.

TABLE 1

Example 1

| | r | d | nd | vd |
|---|---|---|---|---|
| 1 | 37.800 | 1.20 | 1.84666 | 23.8 |
| 2 | 23.129 | 5.40 | 1.49700 | 81.6 |
| 3 | −163.000 | 0.20 | | |
| 4 | 20.034 | 2.90 | 1.72916 | 54.7 |
| 5 | 54.780 | d1 | | |
| 6 | 48.107 | 0.50 | 1.88300 | 40.8 |
| 7 | 5.604 | 3.20 | | |
| 8 | −7.391 | 0.05 | 1.51313 | 53.1 |
| 9 | −7.776 | 0.75 | 1.69680 | 55.5 |
| 10 | 12.152 | 1.60 | 1.84666 | 23.8 |
| 11 | −21.786 | d2 | | |
| 12 | 27.563 | 1.70 | 1.68893 | 31.1 |
| 13 | −80.000 | d3 | | |
| 14 | −12.843 | 0.86 | 1.84666 | 23.8 |
| 15 | 28.447 | 1.80 | 1.69680 | 55.5 |
| 16 | −13.650 | 0.20 | | |
| 17 | 13.190 | 0.05 | 1.51313 | 53.1 |
| 18 | 12.758 | 2.75 | 1.58313 | 59.4 |
| 19 | −12.758 | d4 | | |
| 20 | inf | 0.20 | 1.54880 | 67.0 |
| 21 | inf | 0.75 | 1.51633 | 64.1 |
| 22 | inf | 0.45 | | |
| 23 | inf | 13.30 | 1.51633 | 64.1 |
| 24 | inf | 0.45 | | |
| 25 | inf | 0.70 | 1.51633 | 64.1 |

$8^{th}$ surface

K = −5.87310E−01
A4 = 2.87030E−06
A6 = 4.99110E−05
A8 = −1.30850E−05
A10 = 1.29280E−06
A12 = −4.76370E−08

$12^{th}$ surface

K = 0.00000E+00
A4 = −5.82270E−04
A6 = 3.68000E−05
A8 = −3.08950E−06
A10 = 1.01280E−07
A12 = 3.78000E−09

$13^{th}$ surface

K = 0.00000E+00
A4 = −6.10040E−04
A6 = 5.17500E−05
A8 = −4.69510E−06
A10 = 2.12100E−07

$17^{th}$ surface

K = −1.51240E+00
A4 = −2.54720E−04
A6 = 2.59120E−06
A8 = −9.81640E−08
A10 = 1.91810E−09

| Focal length | d1 | d2 | d3 | d4 |
|---|---|---|---|---|
| 3.33 | 0.6 | 18.77 | 7.88 | 0.75 |
| 10.26 | 11.04 | 8.33 | 5.87 | 2.76 |
| 31.62 | 17.37 | 2.0 | 6.16 | 2.47 |

In FIG. 1, the rear-focus type zoom lens in Example 1 includes four lens groups, in the order from the object side, of the first lens group G1 having positive refracting power, the second lens group G2 having negative refracting power and moving for variable magnification, diaphragm S, the third lens group G3 having positive refracting power and the fourth lens group G4 having positive refracting power and moving for correcting position changes on the image plane in the case of variable magnification, and on its image side, there are arranged infrared cut filter IR+lowpass filter LF, photolytic prism ODP representing a color separation optical element and a cover glass CG of CCD.

The first lens group G1 is composed, in the order from the object side, of negative lens L11, positive lens L12 and positive lens L13, the second lens group G2 has therein negative lens L21, negative lens L22 and positive lens L23 in this order from the object side, the third lens group G3 is composed of single lens L31 with positive refracting power wherein at least one surface is an aspheric surface, and the fourth lens group has a lens having at least one surface of aspheric surface and is composed, from the object side, of negative lens L41, positive lens L42 and positive lens L43.

In the first lens group G1, negative lens L11 and positive lens L12 are cemented each other to be a cemented lens. Further, for the positive lens L12, specific low dispersion glass or abnormal dispersion glass is used.

Negative lens L22 included in the second lens group G2 is a compound aspheric lens on which aspheric surface resin PL is formed on a glass spherical surface on the object side. In the second lens group G2, negative lens L22 and positive lens L23 are cemented each other to be a cemented lens. Positive lens L31 of the third lens group G3 is a piece of glass mold lens with positive refracting power having an aspheric surface form on each of its both sides. In the fourth lens group G4, negative lens L41 and positive lens L42 are cemented each other to be a cemented lens. Positive lens L43 included in the fourth lens group G4 is a compound aspheric lens on which aspheric surface resin PL is formed on a glass spherical surface on the object side.

In the direction toward a telephoto end from a wide angle end, the first lens group G1 is fixed, the second lens group G2 moves toward the image side in the optical axis direction, the third lens group G3 is fixed, and fourth lens group G4 moves toward the object side in the optical axis direction, and then, moves to return to the image side, whereby, focusing covering from an object at an infinite position to an object at a short distance, is carried out. Incidentally, diaphragm S arranged on the object side of the third lens group G3 is in the structure wherein an aperture diameter varies depending on the position of the second lens group G2 on the optical axis, and detailed illustration and explanation for the diaphragm S will be omitted here because it is commonly known.

EXAMPLE 2

Figure 3:
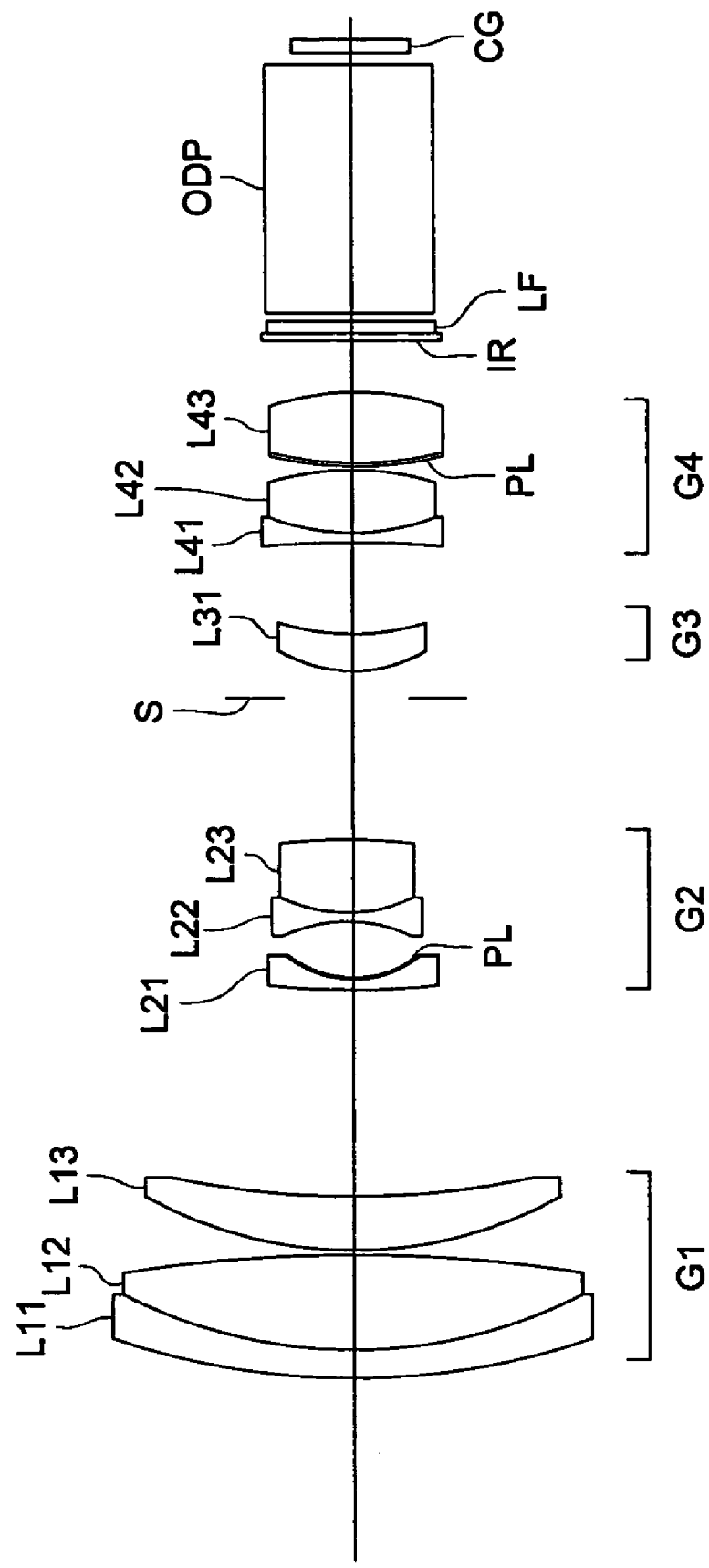
FIG. 3 is a cross-sectional view of an intermediate portion of a zoom lens relating to Example 2.
Figure 4:
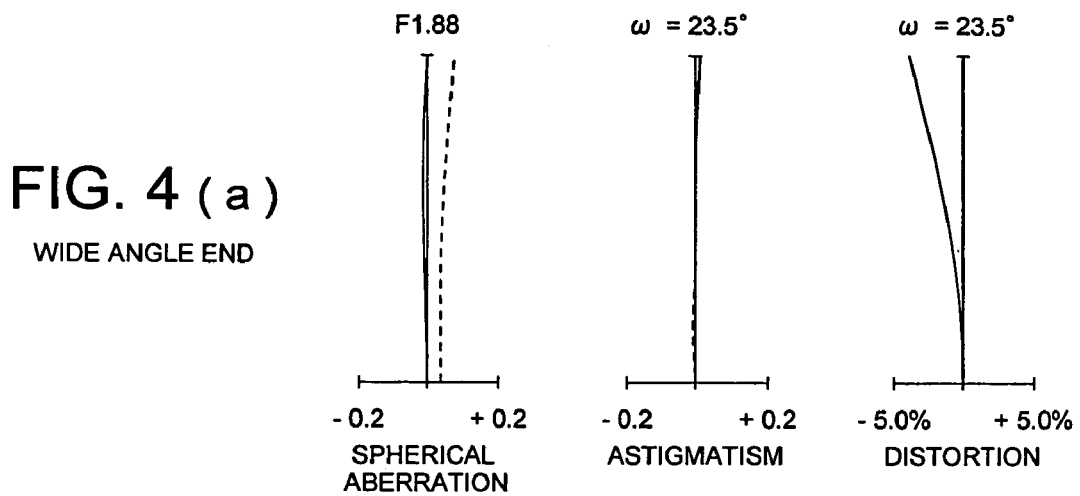
FIGS. 4(a) to 4(c) show aberration diagrams including spherical aberration, astigmatism and distortion of a zoom lens relating to Example 2.
Figure 4:
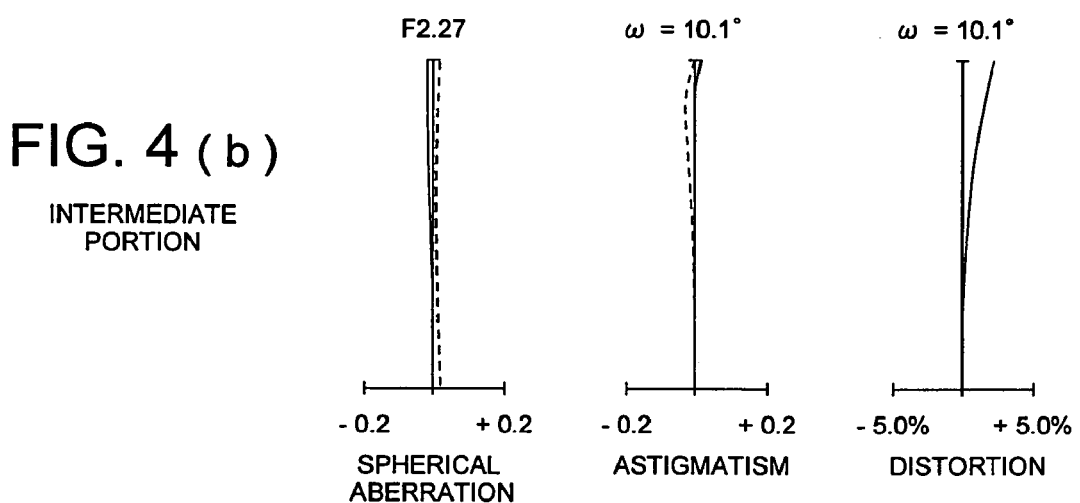
Figure 4:
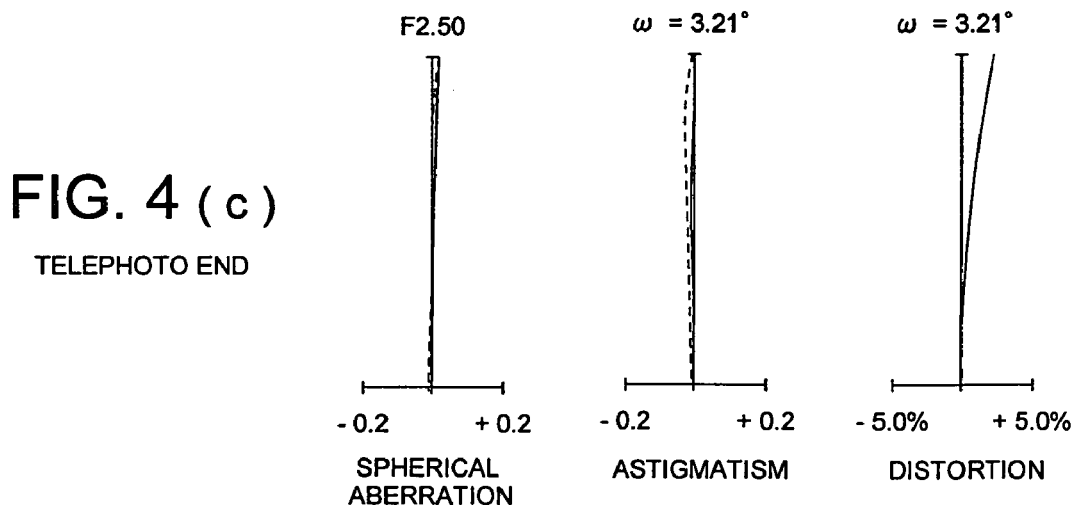

Lens data of a zoom lens relating to Example 2 are shown in Table 2. Further, FIG. 3 shows a cross-sectional view of the intermediate portion of the zoom lens relating to Example 2, and FIG. 4 shows aberration diagrams including spherical aberration, astigmatism and distortion of the zoom lens relating to Example 2. In this case, FIG. 4($a$) is an aberration diagram at a wide angle end. FIG. 4($b$) is an aberration diagram in the intermediate portion. FIG. 4($c$) is an aberration diagram at a telephoto end.

TABLE 2

| | Example 2 | | | |
|---|---|---|---|---|
| | Example 2 | | | |
| | r | d | nd | vd |
| 1 | 49.494 | 0.80 | 1.84666 | 23.8 |
| 2 | 24.068 | 5.00 | 1.49700 | 81.6 |
| 3 | −81.942 | 0.20 | | |
| 4 | 20.886 | 3.00 | 1.80400 | 46.6 |
| 5 | 65.698 | d1 | | |
| 6 | 40.707 | 0.50 | 1.88300 | 40.8 |
| 7 | 6.483 | 0.05 | 1.51313 | 53.1 |
| 8 | 6.062 | 2.90 | | |
| 9 | −9.040 | 0.50 | 1.72000 | 50.2 |

TABLE 2-continued

| | Example 2 | | | |
|---|---|---|---|---|
| 10 | 7.152 | 4.00 | 1.84666 | 23.8 |
| 11 | −58.320 | d2 | | |
| 12 | 7.291 | 2.00 | 1.60700 | 27.1 |
| 13 | 8.851 | d3 | | |
| 14 | −34.406 | 0.50 | 1.84666 | 23.8 |
| 15 | 13.669 | 3.30 | 1.69680 | 55.5 |
| 16 | −19.150 | 0.20 | | |
| 17 | 13.438 | 0.05 | 1.51313 | 53.1 |
| 18 | 13.651 | 3.80 | 1.58913 | 61.2 |
| 19 | −15.590 | d4 | | |
| 20 | inf | 0.20 | 1.54880 | 67.0 |
| 21 | inf | 0.70 | 1.51633 | 64.1 |
| 22 | inf | 0.45 | | |
| 23 | inf | 13.30 | 1.51633 | 64.1 |
| 24 | inf | 0.45 | | |
| 25 | inf | 0.70 | 1.51633 | 64.1 |

$8^{th}$ surface

K = 2.31060E−01
A4 = −7.59890E−05
A6 = −7.46340E−07
A8 = −6.87790E−07
A10 = 6.47310E−08
A12 = −1.71290E−09

$12^{th}$ surface

K = 9.87000E−01
A4 = −3.73900E−04
A6 = −1.79850E−05
A8 = 3.37880E−07
A10 = −3.15630E−08

$13^{th}$ surface

K = 6.98320E−01
A4 = 4.38720E−05
A6 = −3.58640E−06
A8 = 2.23740E−07
A10 = −6.70160E−09

$17^{th}$ surface

K = −3.75150E+00
A4 = 7.10650E−07
A6 = −1.30580E−06
A8 = 2.20170E−08
A10 = −2.72250E−10

| Focal length | d1 | d2 | d3 | d4 |
|---|---|---|---|---|
| 3.53 | 0.6 | 18.26 | 6.60 | 1.00 |
| 10.91 | 10.61 | 8.25 | 4.73 | 2.87 |
| 33.61 | 16.86 | 2.0 | 6.11 | 1.49 |

In FIG. 3, the rear-focus type zoom lens in Example 2 includes four lens groups, in the order from the object side, of the first lens group G1 having positive refracting power, the second lens group G2 having negative refracting power and moving for variable magnification, diaphragm S, the third lens group G3 having positive refracting power and the fourth lens group G4 having positive refracting power and moving for correcting position changes on the image plane in the case of variable magnification, and on its image side, there are arranged infrared cut filter IR+lowpass filter LF, photolytic prism ODP representing a color separation optical element and a cover glass CG of CCD.

The first lens group G1 is composed, in the order from the object side, of negative lens L11, positive lens L12 and positive lens L13, the second lens group G2 has therein negative lens L21, negative lens L22 and positive lens L23 in this order from the object side, the third lens group G3 is composed of single lens L31 with positive refracting power wherein at least one surface is an aspheric surface, and the fourth lens group has a lens having at least one surface of aspheric surface and is composed, from the object side, of negative lens L41, positive lens L42 and positive lens L43.

In the first lens group G1, negative lens L11 and positive lens L12 are cemented each other to be a cemented lens. Further, for the positive lens L12, specific low dispersion glass or abnormal dispersion glass is used.

Negative lens L21 included in the second lens group G2 is a compound aspheric lens on which aspheric surface resin PL is formed on a glass spherical surface on the object side. In the second lens group G2, negative lens L22 and positive lens L23 are cemented each other to be a cemented lens. Positive lens L31 of the third lens group G3 is a piece of plastic lens with positive refracting power having an aspheric surface form on each of its both sides. In the fourth lens group G4, negative lens L41 and positive lens L42 are cemented each other to be a cemented lens. Positive lens L43 included in the fourth lens group G4 is a compound aspheric lens on which aspheric surface resin PL is formed on a glass spherical surface on the object side.

In the direction toward a telephoto end from a wide angle end, the first lens group G1 is fixed, the second lens group G2 moves toward the image side in the optical axis direction, the third lens group G3 is fixed, and fourth lens group G4 moves toward the object side in the optical axis direction, and then, moves to return to the image side, whereby, focusing covering from an object at an infinite position to an object at a short distance, is carried out. Incidentally, diaphragm S arranged on the object side of the third lens group G3 is in the structure wherein an aperture diameter varies depending on the position of the second lens group G2 on the optical axis, and detailed illustration and explanation for the diaphragm S will be omitted here because it is commonly known.

EXAMPLE 3

Figure 5:
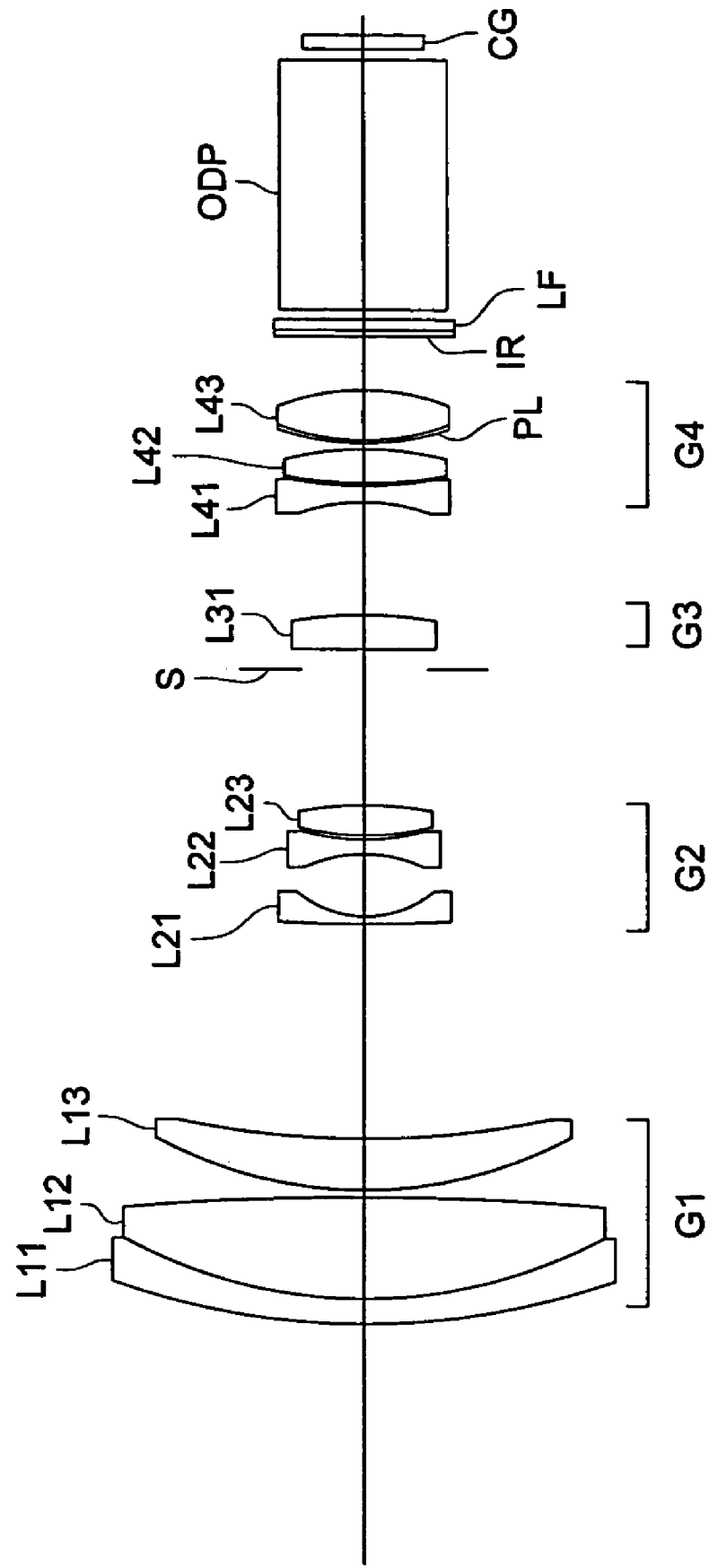
FIG. 5 is a cross-sectional view of an intermediate portion of a zoom lens relating to Example 3.
Figure 6:
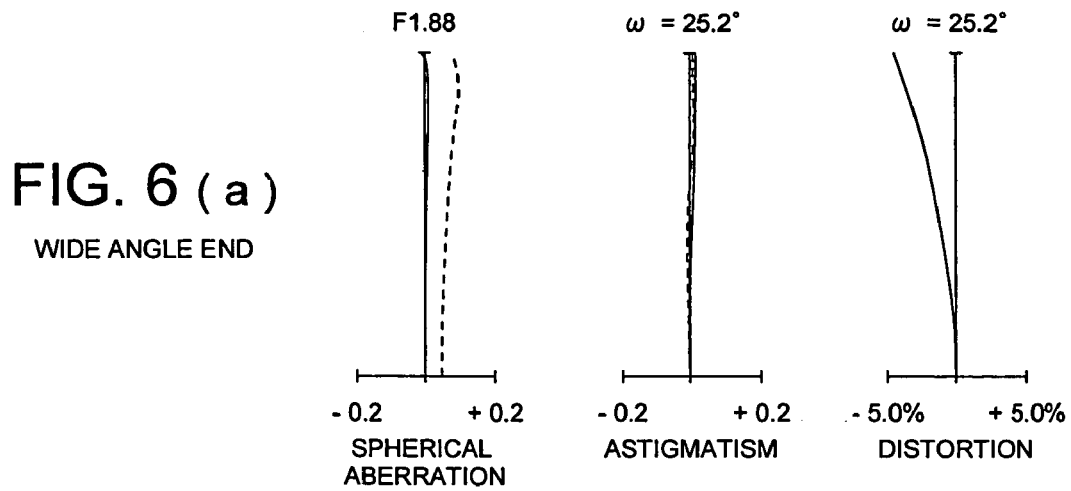
FIGS. 6(a) to 6(c) show aberration diagrams including spherical aberration, astigmatism and distortion of a zoom lens relating to Example 3.
Figure 6:
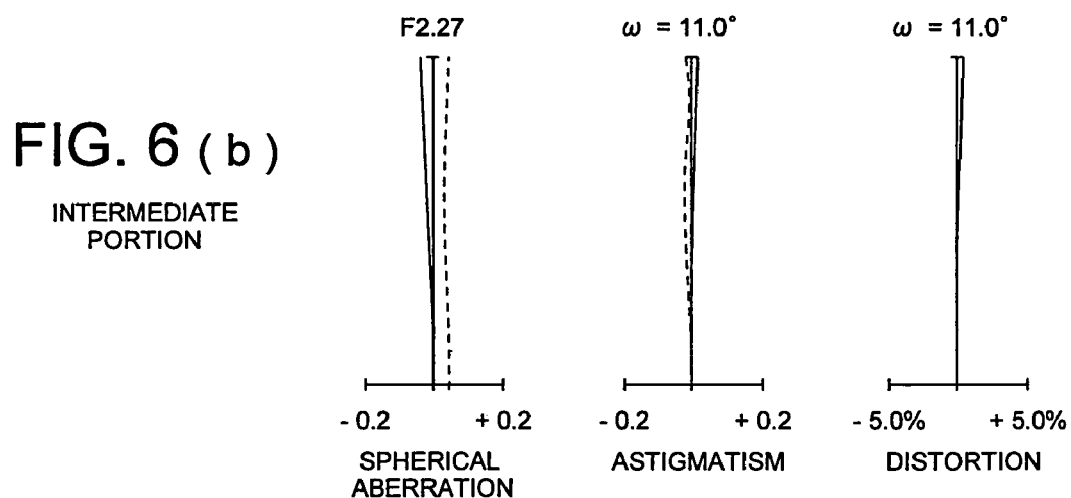
Figure 6:
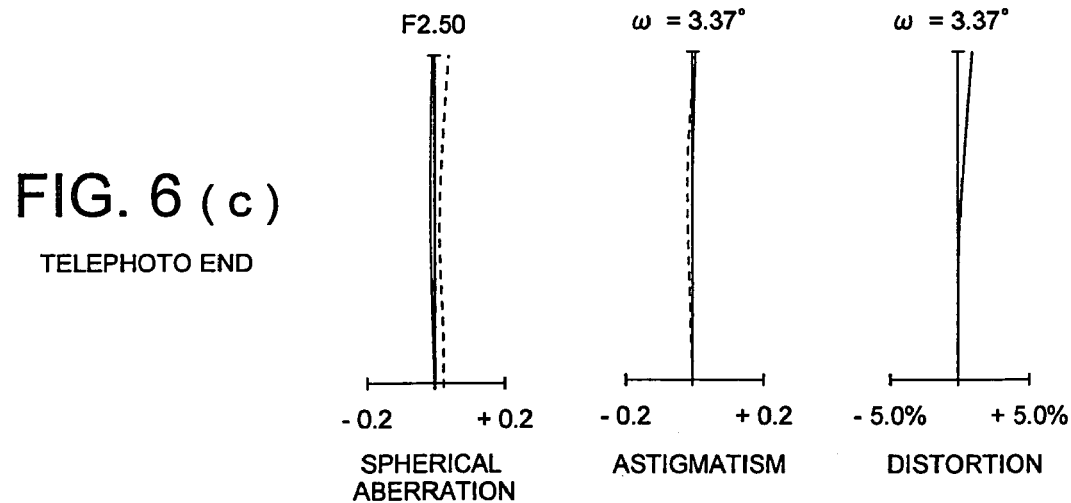

Lens data of a zoom lens relating to Example 3 are shown in Table 3. Further, FIG. 5 shows a cross-sectional view of the intermediate portion of the zoom lens relating to Example 3, and FIG. 6 shows aberration diagrams including spherical aberration, astigmatism and distortion of the zoom lens relating to Example 3. In this case, FIG. 6(a) is an aberration diagram at a wide angle end. FIG. 6(b) is an aberration diagram in the intermediate portion. FIG. 6(c) is an aberration diagram at a telephoto end.

TABLE 3

Example 3

| | r | d | nd | vd |
|---|---|---|---|---|
| 1 | 37.768 | 1.20 | 1.84666 | 23.8 |
| 2 | 23.183 | 5.40 | 1.49700 | 81.6 |
| 3 | −162.271 | 0.20 | | |
| 4 | 20.034 | 2.90 | 1.72916 | 54.7 |
| 5 | 54.755 | d1 | | |
| 6 | 50.954 | 0.50 | 1.88300 | 40.8 |
| 7 | 5.771 | 3.20 | | |
| 8 | −7.520 | 0.05 | 1.51313 | 53.1 |
| 9 | −7.645 | 0.75 | 1.69680 | 55.5 |
| 10 | 11.949 | 0.10 | | |
| 11 | 12.887 | 1.60 | 1.84666 | 23.8 |
| 12 | −21.792 | d2 | | |
| 13 | 29.932 | 1.70 | 1.68893 | 31.1 |
| 14 | −63.977 | d3 | | |
| 15 | −13.258 | 0.86 | 1.84666 | 23.8 |

TABLE 3-continued

Example 3

| 16 | 25.501 | 0.10 | | |
|---|---|---|---|---|
| 17 | 26.834 | 1.80 | 1.69680 | 55.5 |
| 18 | −14.058 | 0.20 | | |
| 19 | 13.294 | 0.05 | 1.51313 | 53.1 |
| 20 | 12.672 | 2.75 | 1.58313 | 59.4 |
| 21 | −12.672 | d4 | | |
| 22 | inf | 0.20 | 1.54880 | 67.0 |
| 23 | inf | 0.75 | 1.51633 | 64.1 |
| 24 | inf | 0.45 | | |
| 25 | inf | 13.30 | 1.51633 | 64.1 |
| 26 | inf | 0.45 | | |
| 27 | inf | 0.70 | 1.51633 | 64.1 |

$8^{th}$ surface

K = −6.52600E−01
A4 = 3.50810E−05
A6 = 4.99960E−05
A8 = −1.25710E−05
A10 = 1.20130E−06
A12 = −4.21060E−08

$13^{th}$ surface

K = 0.00000E+00
A4 = −6.11300E−04
A6 = 3.76260E−05
A8 = −3.03710E−06
A10 = 8.25340E−08
A12 = 4.73030E−09

$14^{th}$ surface

K = 0.00000E+00
A4 = −6.34770E−04
A6 = 5.28970E−05
A8 = −4.81410E−06
A10 = 2.14980E−07

$19^{th}$ surface

K = −1.45040E+00
A4 = −2.52820E−04
A6 = 2.35780E−06
A8 = −8.69650E−08
A10 = 1.63300E−09

| Focal length | d1 | d2 | d3 | d4 |
|---|---|---|---|---|
| 3.33 | 0.6 | 18.77 | 8.00 | 0.82 |
| 10.26 | 11.08 | 8.28 | 6.05 | 2.77 |
| 31.57 | 17.37 | 2.0 | 6.45 | 2.37 |

In FIG. 5, the rear-focus type zoom lens in Example 3 includes four lens groups, in the order from the object side, of the first lens group G1 having positive refracting power, the second lens group G2 having negative refracting power and moving for variable magnification, diaphragm S, the third lens group G3 having positive refracting power and the fourth lens group G4 having positive refracting power and moving for correcting position changes on the image plane in the case of variable magnification, and on its image side, there are arranged infrared cut filter IR+lowpass filter LF, photolytic prism ODP representing a color separation optical element and a cover glass CG of CCD.

The first lens group G1 is composed, in the order from the object side, of negative lens L11, positive lens L12 and positive lens L13, the second lens group G2 has therein negative lens L21, negative lens L22 and positive lens L23 in this order from the object side, the third lens group G3 is composed of single lens L31 with positive refracting power wherein at least one surface is an aspheric surface, and the fourth lens group has a lens having at least one surface of aspheric surface and is composed, from the object side, of negative lens L41, positive lens L42 and positive lens L43.

In the first lens group G1, negative lens L11 and positive lens L12 are cemented each other to be a cemented lens. Further, for the positive lens L12, specific low dispersion glass or abnormal dispersion glass is used.

Positive lens L31 of the third lens group G3 is a piece of glass mold lens having positive refracting power having an aspheric surface form on each of its both sides. Positive lens L43 included in the fourth lens group G4 is a compound aspheric lens on which aspheric surface resin PL is formed on a glass spherical surface on the object side.

In the direction toward a telephoto end from a wide angle end, the first lens group G1 is fixed, the second lens group G2 moves toward the image side in the optical axis direction, the third lens group G3 is fixed, and fourth lens group G4 moves toward the object side in the optical axis direction, and then, moves to return to the image side, whereby, focusing covering from an object at an infinite position to an object at a short distance, is carried out. Incidentally, diaphragm S arranged on the object side of the third lens group G3 is in the structure wherein an aperture diameter varies depending on the position of the second lens group G2 on the optical axis, and detailed illustration and explanation for the diaphragm S will be omitted here because it is commonly known.

EXAMPLE 4

Figure 7:
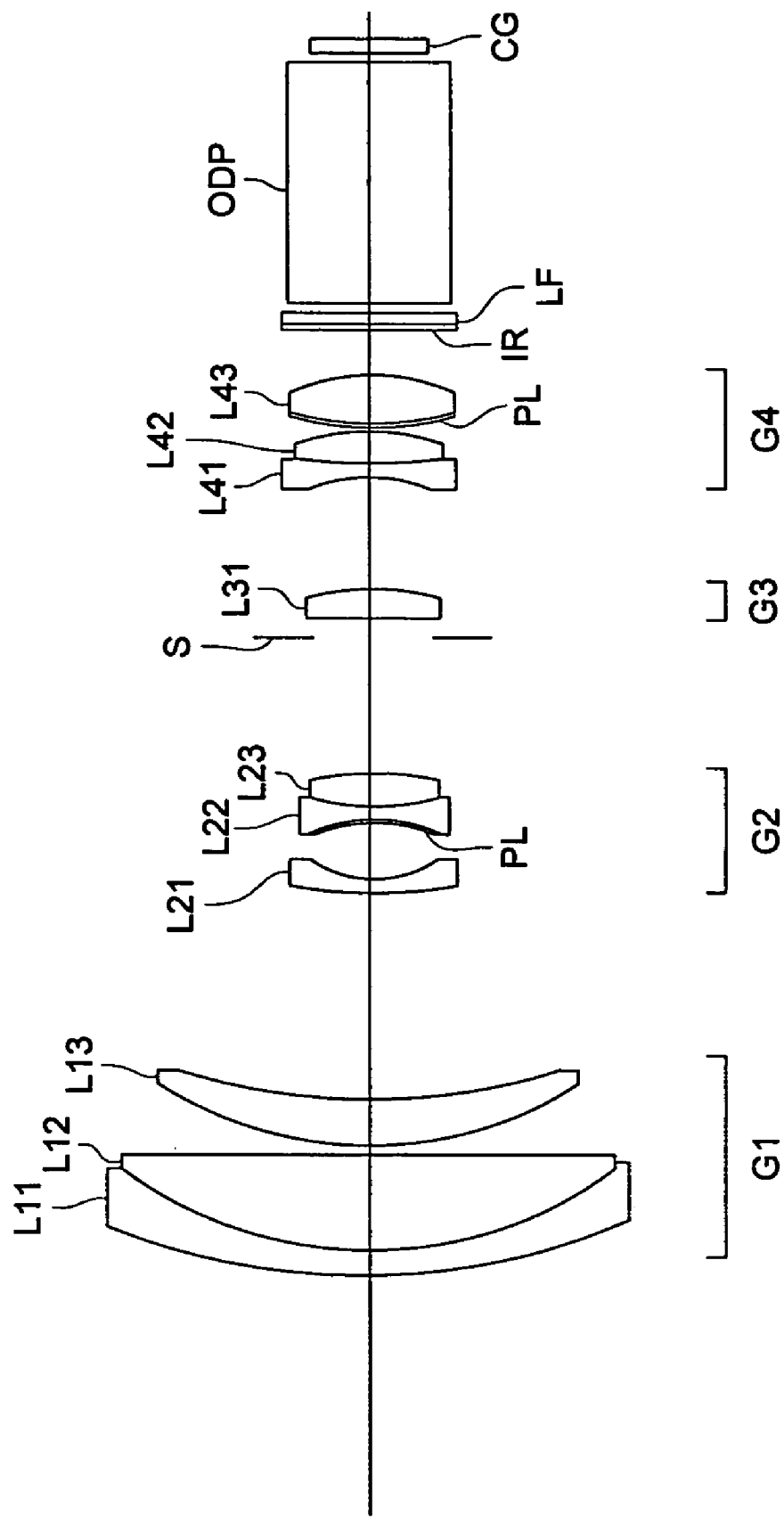
FIG. 7 is a cross-sectional view of an intermediate portion of a zoom lens relating to Example 4.

Lens data of a zoom lens relating to Example 4 are shown in Table 4. Further, FIG. 7 shows a cross-sectional view of the intermediate portion of the zoom lens relating to Example 4, and FIG. 8 shows aberration diagrams including spherical aberration, astigmatism and distortion of the zoom lens relating to Example 4. In this case, FIG. 8($a$) is an aberration diagram at a wide angle end. FIG. 8($b$) is an aberration diagram in the intermediate portion. FIG. 8($c$) is an aberration diagram at a telephoto end.

TABLE 4

Example 4

| | r | d | nd | vd |
|---|---|---|---|---|
| 1 | 36.237 | 1.20 | 1.84666 | 23.8 |
| 2 | 19.562 | 5.40 | 1.74320 | 49.3 |
| 3 | inf | 0.20 | | |
| 4 | 18.043 | 2.90 | 1.49700 | 81.6 |
| 5 | 37.355 | d1 | | |
| 6 | 116.723 | 0.50 | 1.88300 | 40.8 |
| 7 | 5.533 | 3.20 | | |
| 8 | −9.634 | 0.05 | 1.51313 | 53.1 |
| 9 | −10.555 | 0.75 | 1.69680 | 55.5 |
| 10 | 8.694 | 1.60 | 1.84666 | 23.8 |
| 11 | −32.841 | d2 | | |
| 12 | 130.432 | 1.60 | 1.68893 | 31.1 |
| 13 | −24.437 | d3 | | |
| 14 | −10.843 | 0.86 | 1.84666 | 23.8 |
| 15 | 36.576 | 1.80 | 1.69680 | 55.5 |
| 16 | −12.542 | 0.20 | | |
| 17 | 12.765 | 0.05 | 1.51313 | 53.1 |
| 18 | 14.590 | 2.75 | 1.58313 | 59.4 |
| 19 | −11.955 | d4 | | |
| 20 | inf | 0.20 | 1.54880 | 67.0 |
| 21 | inf | 0.75 | 1.51633 | 64.1 |
| 22 | inf | 0.45 | | |
| 23 | inf | 13.30 | 1.51633 | 64.1 |
| 24 | inf | 0.45 | | |
| 25 | inf | 0.70 | 1.51633 | 64.1 |

TABLE 4-continued

Example 4

8$^{th}$ surface

K = −7.89110E−02
A4 = 1.55570E−04
A6 = 3.03120E−05
A8 = −7.49420E−06
A10 = 7.72090E−07
A12 = −2.95730E−08

12$^{th}$ surface

K = 0.00000E+00
A4 = −8.58670E−04
A6 = 1.93770E−05
A8 = −1.42660E−06
A10 = 5.76590E−08
A12 = 4.60080E−09

13$^{th}$ surface

K = 0.00000E+00
A4 = −8.51240E−04
A6 = 3.43950E−05
A8 = −2.92060E−06
A10 = 1.55670E−07

17$^{th}$ surface

K = −1.17360E+00
A4 = −3.10580E−04
A6 = 2.57570E−06
A8 = −8.23000E−08
A10 = 1.59420E−09

| Focal length | d1 | d2 | d3 | d4 |
|---|---|---|---|---|
| 3.33 | 0.5 | 19.14 | 7.74 | 0.76 |
| 10.26 | 11.00 | 8.64 | 5.96 | 2.54 |
| 31.62 | 17.25 | 2.39 | 6.41 | 2.09 |

In FIG. 7, the rear-focus type zoom lens in Example 4 includes four lens groups, in the order from the object side, of the first lens group G1 having positive refracting power, the second lens group G2 having negative refracting power and moving for variable magnification, diaphragm S, the third lens group G3 having positive refracting power and the fourth lens group G4 having positive refracting power and moving for correcting position changes on the image plane in the case of variable magnification, and on its image side, there are arranged infrared cut filter IR+lowpass filter LF, photolytic prism ODP representing a color separation optical element and a cover glass CG of CCD.

The first lens group G1 is composed, in the order from the object side, of negative lens L11, positive lens L12 and positive lens L13, the second lens group G2 has therein negative lens L21, negative lens L22 and positive lens L23 in this order from the object side, the third lens group G3 is composed of single lens L31 with positive refracting power wherein at least one surface is an aspheric surface, and the fourth lens group has a lens having at least one surface of aspheric surface and is composed, from the object side, of negative lens L41, positive lens L42 and positive lens L43.

In the first lens group G1, negative lens L11 and positive lens L12 are cemented each other to be a cemented lens. Further, for the positive lens L12, specific low dispersion glass or abnormal dispersion glass is used.

Negative lens L22 included in the second lens group G2 is a compound aspheric lens on which aspheric surface resin PL is formed on a glass spherical surface on the image side. In the second lens group G2, negative lens L22 and positive lens L23 are cemented each other to be a cemented lens. Positive lens L31 of the third lens group G3 is a piece of glass mold lens with positive refracting power having an aspheric surface form on each of its both sides. In the fourth lens group G4, negative lens L41 and positive lens L42 are cemented each other to be a cemented lens. Positive lens. L43 included in the fourth lens group G4 is a compound aspheric lens on which aspheric surface resin PL is formed on a glass spherical surface on the object side.

In the direction toward a telephoto end from a wide angle end, the first lens group G1 is fixed, the second lens group G2 moves toward the image side in the optical axis direction, the third lens group G3 is fixed, and fourth lens group G4 moves toward the object side in the optical axis direction, and then, moves to return to the image side, whereby, focusing covering from an object at an infinite position to an object at a short distance, is carried out. Incidentally, diaphragm S arranged on the object side of the third lens group G3 is in the structure wherein an aperture diameter varies depending on the position of the second lens group G2 on the optical axis, and detailed illustration and explanation for the diaphragm S will be omitted here because it is commonly known.

EXAMPLE 5

Figure 9:
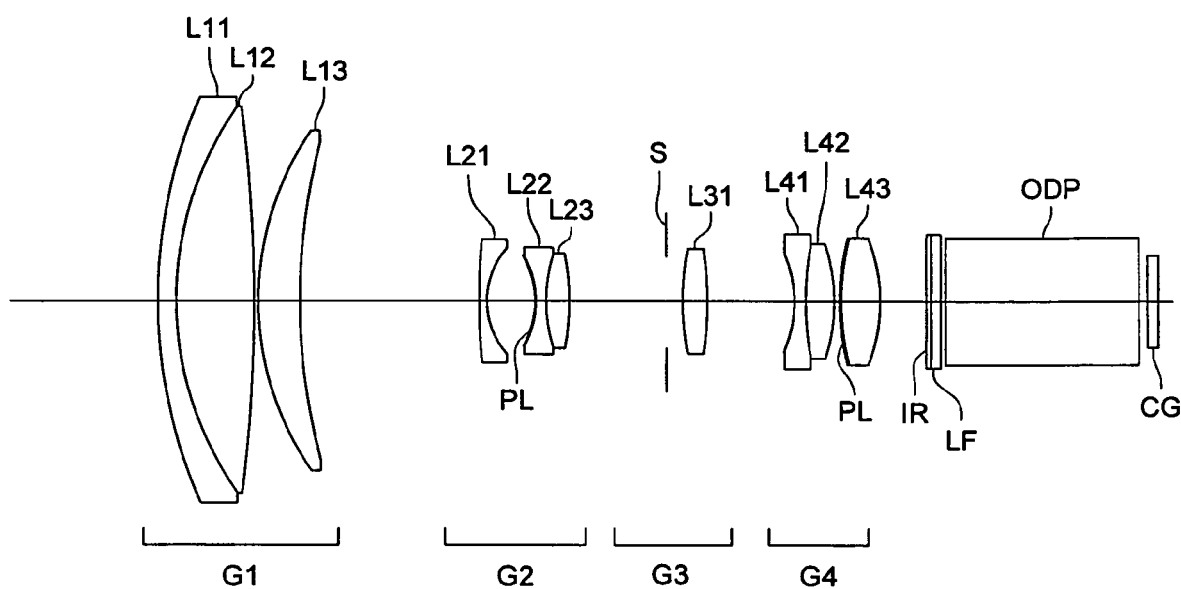
FIG. 9 is a cross-sectional view of an intermediate portion of a zoom lens relating to Example 5.
Figure 10:
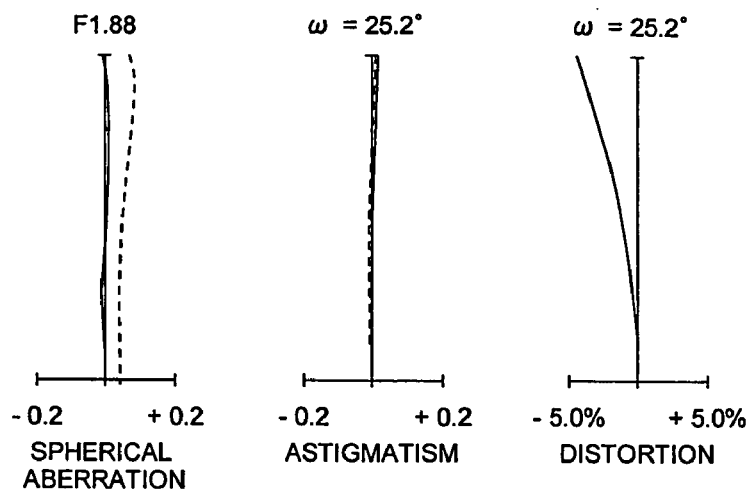
FIGS. 10(a) to 10(c) show aberration diagrams including spherical aberration, astigmatism and distortion of a zoom lens relating to Example 5.
Figure 10:
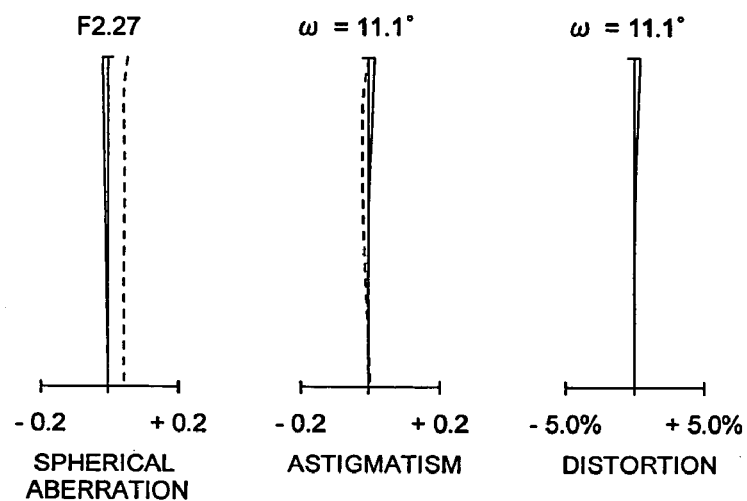
Figure 10:
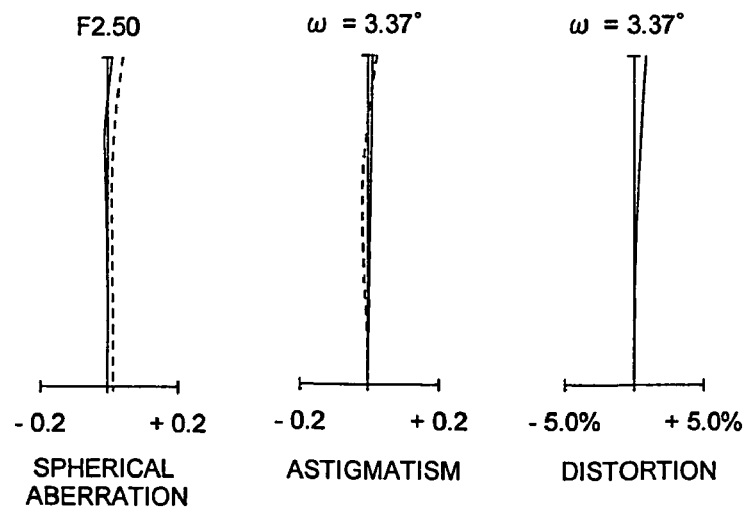

Lens data of a zoom lens relating to Example 5 are shown in Table 5. Further, FIG. 9 shows a cross-sectional view of the intermediate portion of the zoom lens relating to Example 5, and FIG. 10 shows aberration diagrams including spherical aberration, astigmatism and distortion of the zoom lens relating to Example 5. In this case, FIG. 10(*a*) is an aberration diagram at a wide angle end. FIG. 10(*b*) is an aberration diagram in the intermediate portion. FIG. 10(*c*) is an aberration diagram at a telephoto end.

TABLE 5

Example 5

| | r | d | nd | vd |
|---|---|---|---|---|
| 1 | 35.652 | 1.00 | 1.84666 | 23.8 |
| 2 | 22.806 | 5.28 | 1.45650 | 90.2 |
| 3 | −130.05 | 0.20 | | |
| 4 | 19.837 | 2.90 | 1.80400 | 46.6 |
| 5 | 54.159 | d1 | | |
| 6 | 49.676 | 0.50 | 1.88300 | 40.8 |
| 7 | 5.596 | 3.19 | 1.51313 | 53.1 |
| 8 | −7.281 | 0.05 | | |
| 9 | −8.397 | 0.75 | 1.72000 | 50.2 |
| 10 | 12.286 | 1.60 | 1.84666 | 23.8 |
| 11 | −21.785 | d2 | | |
| 12 | 28.511 | 1.60 | 1.69895 | 30.1 |
| 13 | −77.428 | d3 | | |
| 14 | −13.709 | 0.86 | 1.84666 | 23.8 |
| 15 | 25.023 | 1.80 | 1.69680 | 55.5 |
| 16 | −14.556 | 0.20 | | |
| 17 | 13.363 | 0.05 | 1.51313 | 53.1 |
| 18 | 12.529 | 2.86 | 1.58913 | 61.2 |
| 19 | −12.529 | d4 | | |
| 20 | inf | 0.20 | 1.54880 | 67.0 |
| 21 | inf | 0.70 | 1.51633 | 64.1 |
| 22 | inf | 0.45 | | |
| 23 | inf | 13.30 | 1.51633 | 64.1 |
| 24 | inf | 0.45 | | |
| 25 | inf | 0.70 | 1.51633 | 64.1 |

8th surface

K = −0.94602E−00
A4 = −1.08020E−04
A6 = 4.67000E−05

TABLE 5-continued

Example 5

A8 = −1.23610E−05
A10 = 1.20350E−06
A12 = −4.37210E−08
12th surface

K = 0.00000E−00
A4 = −5.82270E−04
A6 = 3.68000E−05
A8 = −3.08950E−06
A10 = 1.01280E−07
A12 = 3.78000E−09
13th surface K = 0.00000E−00
A4 = −6.10040E−04
A6 = 5.17500E−05
A8 = −4.69510E−06
A10 = 2.12100E−07
17th surface K = −1.44820E+00
A4 = −2.68180E−08
A6 = 2.88610E−06
A8 = −1.10830E−07
A10 = 2.16310E−09

| Focal length | d1 | d2 | d3 | d4 |
|---|---|---|---|---|
| 3.33 | 0.6 | 18.77 | 7.89 | 0.76 |
| 11.23 | 11.65 | 7.71 | 5.73 | 2.92 |
| 31.51 | 17.37 | 2.0 | 6.14 | 2.50 |

In FIG. 9, the rear-focus type zoom lens in Example 5 includes four lens groups, in the order from the object side, of the first lens group G1 having positive refracting power, the second lens group G2 having negative refracting power and moving for variable magnification, diaphragm S, the third lens group G3 having positive refracting power and the fourth lens group G4 having positive refracting power and moving for correcting position changes on the image plane in the case of variable magnification, and on its image side, there are arranged infrared cut filter IR+lowpass filter LF, photolytic prism ODP representing a color separation optical element and a cover glass CG of CCD.

The first lens group G1 is composed, in the order from the object side, of negative lens L11, positive lens L12 and positive lens L13, the second lens group G2 has therein negative lens L21, negative lens L22 and positive lens L23 in this order from the object side, the third lens group G3 is composed of single lens L31 with positive refracting power wherein at least one surface is an aspheric surface, and the fourth lens group has a lens having at least one surface of aspheric surface and is composed, from the object side, of negative lens L41, positive lens L42 and positive lens L43.

In the first lens group G1, negative lens L11 and positive lens L12 are cemented each other to be a cemented lens. Further, for the positive lens L12, specific low dispersion glass or abnormal dispersion glass is used.

Negative lens L22 included in the second lens group G2 is a compound aspheric lens on which aspheric surface resin PL is formed on a glass spherical surface on the image side. In the second lens group G2, negative lens L22 and positive lens L23 are cemented each other to be a cemented lens. Positive lens L31 of the third lens group G3 is a piece of glass mold lens with positive refracting power having an aspheric surface form on each of its both sides. In the fourth lens group G4, negative lens L41 and positive lens L42 are cemented each other to be a cemented lens. Positive lens L43 included in the fourth lens group G4 is a compound aspheric lens on which aspheric surface resin PL is formed on a glass spherical surface on the object side.

In the direction toward a telephoto end from a wide angle end, the first lens group G1 is fixed, the second lens group G2 moves toward the image side in the optical axis direction, the third lens group G3 is fixed, and fourth lens group G4 moves toward the object side in the optical axis direction, and then, moves to return to the image side, whereby, focusing covering from an object at an infinite position to an object at a short distance, is carried out. Incidentally, diaphragm S arranged on the object side of the third lens group G3 is in the structure wherein an aperture diameter varies depending on the position of the second lens group G2 on the optical axis, and detailed illustration and explanation for the diaphragm S will be omitted here because it is commonly known.

Values of respective examples corresponding to the aforesaid conditional expressions are shown in Table 6.

TABLE 6

|  | Example 1 | Example 2 | Example 3 | Example 4 | Example 5 |
|---|---|---|---|---|---|
| (1) ν1 | 81.6 | 81.6 | 81.6 | 81.6 | 90.3 |
| (2) ν31 | 31.1 | 27.1 | 31.1 | 31.1 | 30.1 |
| (3) f4/|f4−| | 1.17 | 1.00 | 1.19 | 1.23 | 1.18 |
| (4) |f1/f2| | 5.49 | 4.93 | 5.44 | 5.63 | 5.46 |
| (6) f3/fw | 9.00 | 12.98 | 8.96 | 9.01 | 9.09 |
| (7) Bfw/fw | 3.81 | 3.66 | 3.83 | 3.81 | 3.81 |

What is claimed is:

1. A rear focus type zoom lens for an image capturing element, comprising, in the order from the object side:

a first lens group having a positive refracting power;

a second lens group having a negative refracting power and movable for variable magnification;

a third lens group having a positive refracting power; and a fourth lens group having a positive refracting power and movable for correcting positional change of an image plane in variable magnification;

wherein the first lens group includes, in the order from the object side, a negative lens (L11), a positive lens (L12) and a positive lens (L13), the second lens group includes, in the order from the object side, a negative lens (L21), a negative lens (L22) and a positive lens (L23), the third lens group includes a single lens (L31) having a positive refracting power and having at least one aspheric surface and the fourth lens group has at least one aspheric surface or more and includes, in the order from the object side, a negative lens (L41), a positive lens (L42) and a positive lens (L43), and when ν1 represents Abbe's number of at least one piece of positive lenses of the first lens group, ν31 represents Abbe's number of the single lens (L31), fi represents a focal length of an i$^{th}$ lens group and f4—represents a focal length of the negative lens (L41) in the fourth lens group, the following conditional expressions are satisfied:

$$75.0 < \nu 1 \quad (1)$$

$$40.0 > \nu 31 \quad (2)$$

$$0.8 < f4/|f4-| < 1.5 \quad (3)$$

$$3.0 < |f1/f2| < 6.0 \quad (4).$$

2. The zoom lens for an image capturing element according to claim 1, wherein the positive lens (L12) included in the first lens group satisfies the following conditional expression:

$$75.0 < \nu 1 \quad (5).$$

3. The zoom lens for an image capturing element according to claim 1, wherein the second lend group has a lens having an aspheric surface form on at least one surface thereof.

4. The zoom lens for an image capturing element according to claim 1, wherein one or more of negative lenses included in the second lens group is a compound aspheric lens wherein an aspheric resin is formed on a glass spherical surface.

5. The zoom lens for an image capturing element according to claim 1, wherein the second lens group has a cemented lens wherein negative lens (L22) and positive lens (L23) are cemented.

6. The zoom lens for an image capturing element according to claim 1, wherein the first lens group has a cemented lens wherein negative lens (L11) and positive lens (L12) are cemented.

7. The zoom lens for an image capturing element according to claim 1, wherein when a focus length of the zoom lens at a wide angle end is fw, the third lens group satisfies the following conditional expression:

$$6.0 < f3/fw < 13.0 \quad (6).$$

8. The zoom lens for an image capturing element according to claim 1, wherein the third lens group is composed of a single lens with positive refracting power having an aspheric surface form on both sides of the single lens.

9. The zoom lens for an image capturing element according to claim 1, wherein the third lens group is composed of a plastic lens with positive refracting power having an aspheric surface form on both sides of the plastic lens.

10. The zoom lens for an image capturing element according to claim 1, wherein the fourth lens group has a cemented lens wherein negative lens (L41) and positive lens (L42) are cemented.

11. The zoom lens for an image capturing element according to claim 1, wherein the positive lens (L43) included in the fourth lens group is a compound aspheric surface lens wherein aspheric surface resin is formed on a glass spherical surface.

12. The zoom lens for an image capturing element according to claim 1, wherein when a focus length of the zoom lens at a wide angle end is fw and an air conversion distance from a lens final face to a image plane at a wide angle end is Bfw, the following conditional expression is satisfied:

$$2.5 < Bfw/fw < 5.0.$$

13. The zoom lens for an image capturing element according to claim 1, wherein the following conditional expression is satisfied:

$$0.9 < f4/|f4-| < 1.3 \quad (8).$$

14. The zoom lens for an image capturing element according to claim 1, wherein the following conditional expression is satisfied:

$$4.5 < |f1/f2| < 6.0 \quad (9).$$

15. The zoom lens for an image capturing element according to claim 1, wherein the following conditional expression is satisfied:

$$8.5 < f3/fw < 13 \quad (10).$$

16. The zoom lens for an image capturing element according to claim 1, wherein a diaphragm is arranged on the object side of the third lens group, and an aperture diameter is changed by its position on the optical axis of the second lens group.

17. The zoom lens for an image capturing element according to claim 1, wherein focusing is carried out for an object at an infinite position up to an object at a short distance, by moving the fourth lens group in the optical axis direction.

18. The zoom lens for an image capturing element according to claim 1, wherein a color separation optical element is arranged on the image surface side of the fourth lens group.

* * * * *